United States Patent [19]
Sciaky

[11] 3,814,896
[45] June 4, 1974

[54] HOLE CENTER LOCATOR

[75] Inventor: Albert M. Sciaky, Palos Park, Ill.

[73] Assignee: Welding Research, Inc., Chicago, Ill.

[22] Filed: June 12, 1973

[21] Appl. No.: 369,264

Related U.S. Application Data

[63] Continuation of Ser. No. 166,008, July 26, 1971, abandoned.

[52] U.S. Cl. ..................... 219/121 EM, 33/169 C
[51] Int. Cl. ........................... B23k 15/00
[58] Field of Search... 219/121 EB, 121 EM, 121 R; 33/189, 169 C; 250/396; 73/339 R; 324/72 EB; 318/562; 84/72

[56] References Cited
UNITED STATES PATENTS

| | | | |
|---|---|---|---|
| 1,058,027 | 4/1913 | Anthony | 33/169 C |
| 3,112,391 | 11/1963 | Sciaky | 219/124 |
| 3,241,243 | 3/1966 | Speer | 33/189 X |
| 3,463,900 | 8/1969 | Downing | 219/121 EB |

*Primary Examiner*—J. V. Truhue
*Assistant Examiner*—G. R. Peterson

[57] ABSTRACT

This invention relates to electron beam welding equipment and, more specifically, to a method which is used to determine the center of a circle, for example, the circle which represents the seam between a tube and a plate into which the tube is installed, such as headers in heat exchangers. By the method of this invention the end of the tube and header is scanned by an electron beam of low intensity sequentially along four paths which radiate from a point outwardly and returning along two mutually perpendicular axes. At the point where the beam strikes the edge of the tubing during its outward motion a pulse is generated which, through an electronic system, determines the distance along the path from the starting point of the beam. This information is summed from two opposite directions which lie along a single axis and is used to generate a biasing current for a set of deflection coils which deflect the beam so that its rest position is progressively brought to the center of the circle. This position is retained in a memory system. Means are also provided so that a weld along a circular path at a desired radius in the vicinity of the edge of the tube may be made.

5 Claims, 11 Drawing Figures

FIG. 1

INVENTOR.
ALBERT M SCIAKY
BY Julius L Solomon

FIG. 10  ANTENNA SIGNAL AMP. OUTPUT

FIG. 7  SCAN CONTROL SIGNALS

FIG.8 SIGNALS AT SCAN SIGNAL GENERATOR

FIG. 9 INPUTS & OUTPUTS SIGNALS AT SAMPLE HOLD

FIG. 11

HOLE CENTER LOCATOR

This is a continuation of application Ser. No. 166,008 filed July 26, 1971 now abandoned.

This invention relates to electron beam welding and, more specifically, to a method for joining tubes to headers of heat exchangers by the electron beam welding process. In the manufacture of heat exchangers it is necessary to weld the ends of a multiplicity of tubes which are inserted in a prearranged pattern of holes on a, so called, header plate. The number of tubes and their diameter depends upon the size of the heat exchanger and, for certain applications, as many as 15,000 tubes having a diameter of 0.635 inches must be welded to the header plate. The metals employed in the heat exchanger must have high heat resistant properties and have, in the past, been welded by the tungsten inert gas welding process. Initially, manual means were employed at a very low production rate of perhaps 200 to 300 tubes welded per week by each operator with questionable quality inasmuch as the manual tungsten-inert gas welding process gives results which depends upon the skill and judgment of the operator. Later automatic T.I.G. welding was introduced to speed the process and provide consistency of operation. This required a machine in which the T.I.G. welding torch had to be positioned over a tube, the wire adjusted and precaution exercised to assure a stable reproducible arc. This resulted in an increased welding speed and improved quality. Production by this method reached a peak of approximately 1,500 tubes per operator per week but was limited to this speed because it was necessary to manually move the welding torch from tube to tube and accurately position it over the center of each tube in turn. The weld produced by the above method was a fillet weld which could be inspected only visually.

It is the object of the apparatus of this invention to produce tube to header welds by the electron beam welding process at rates of speed heretofore unobtainable by the old methods of welding.

Another object of this invention is to position the electron beam gun by means of a numerical control apparatus so that it may be rapidly transferred from one tube to the next on the header.

Another object is to determine by electronic means the amount of offset of the gun from the geometric center of the tube to be welded and to make a correction by deflecting the electron beam so that its new at rest position is at the geometric center of the tube.

Another object of the invention is to control the electron beam so that is moves in a circular path at the seam between the header and the tube at a preset speed so as to effectively form a distinct bonded area between the header and tube from the lip of the tube to a given distance into the face of the header.

Another object of the invention is to control positively the diameter of the circular path of the beam upon the work.

We will now refer to a particular embodiment of the invention and will refer to the following figures to describe the method and apparatus comprising the invention.

FIGS. 7a to 7j are graphical representations of the various scan control signals.

FIGS. 8a to 8h are graphical representations of the signals appearing at different points of the scan signal generator.

Figure 1:
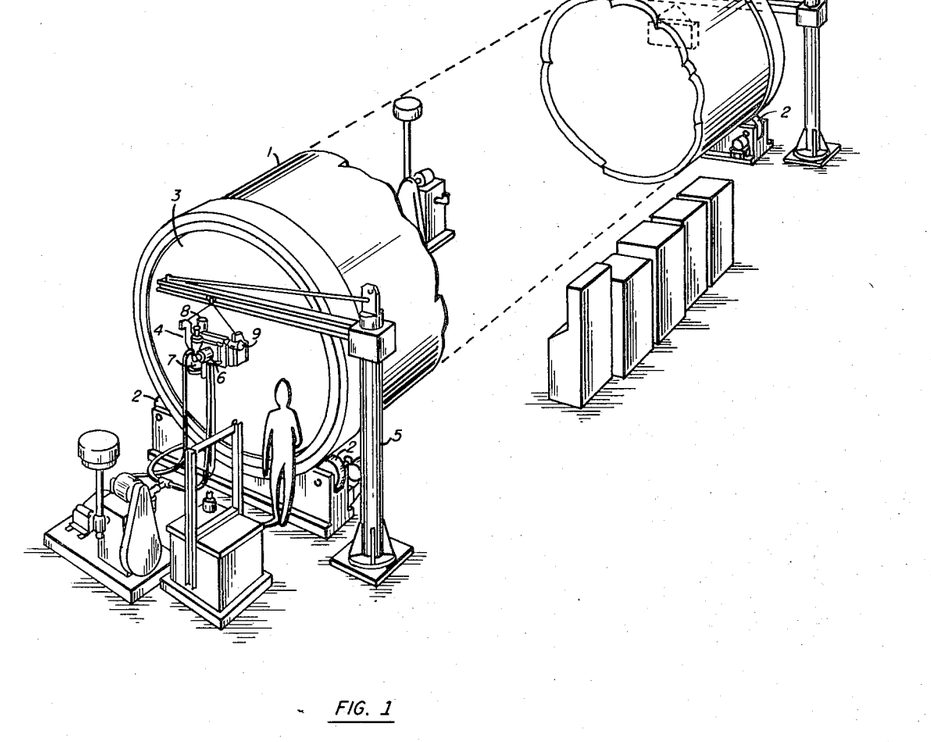
FIG. 1 is a perspective drawing partially cut away showing the general form of a heat exchanger and the various parts of the apparatus installed in place in accordance with the embodiment to be disclosed.

FIG. 1 shows the heat exchanger body 1 supported on rollers 2 so that it may be positioned so that the holes in the header plate 3 are properly aligned with respect to the portable electron beam welder 4. The portable electron beam welder is supported by the crane 5 which can position the electron beam machine from place to place on the header. The electron beam machine incorporates an electron gun 6 which generates the electron beam which is used to weld the end of each tube 10 to the header plate 3. A diffusion pump 7 for maintaining a pressure of at most $10^{-4}$ Torr in the electron beam gun is mounted on the portable welder as are two electric motors 8 and 9 which are utilized to drive the electron beam gun upon its mounting along two axes which are mutually perpendicular to each other with respect to a seal plate 20 on FIG. 3 which seals the electron beam welding machine around a localized area on the header plate which contains a number of openings into which tubes 10 are inserted and later electron beam welded. More than 350 tubes may be sealed off by the seal plate.

Figure 2:
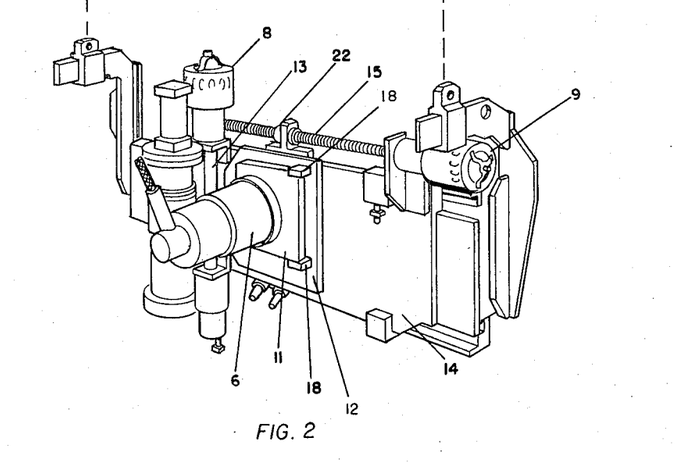
FIG. 2 is a detail in perspective of the welding gun and associated apparatus and fixtures for moving the gun along two mutually perpendicular planes.
Figure 3:
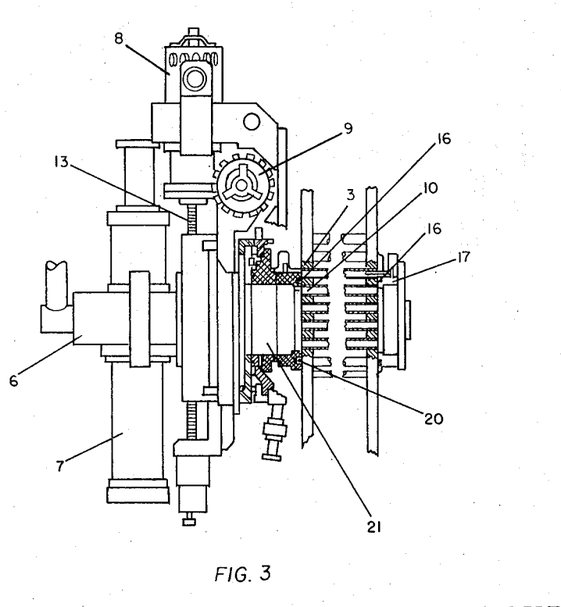
FIG. 3 is a side view of the apparatus shown in FIG. 2 with the tube and header and parts of the sealing structure shown in cross section.

The electron beam welding machine is shown in greater detail in FIGS. 2 and 3. Referring to FIG. 2, the electron gun 6 is shown mounted to plate 11 which is supported by hinges 18 on the vertical sliding member 12. The sliding member 12 may be moved in the vertical direction carrying the electron gun with it by means of electric motor 8 and ball screw 13 which drives the nut which is fixed to the slide plate 12. Slide plate 12 is separated from horizontal slide plate 14 by a flexible continuous sealing means around the periphery of a vertical slot which has been machined in horizontal slide plate 14. The vertical slot allows the electron beam gnereated in the electron gun 6 to pass from the electron gun through a hole in plates 11 and 12, through the slot in slide plate 14 into the vacuum chamber 19 which is made in the space inside the head seal plate 20 and the chamber structure 21, shown on FIG. 3. The seal plate 20 is mounted to the header plate over a localized area which contains a number of tubes which are to be welded to the header plate. This localized area is sealed off by a seal 16 around the periphery of the seal plate 20. The chamber body 21 is affixed to the seal plate with suitable flexible continuous seals between the two adjoining surfaces. The horizontal slide plate 14 may be moved by means of electric motor 9, ball screw 15 and nut 22 which is fixed to the slide plate 14 so that when the screw 15 rotates the slide plate will move along in the horizontal axis. The motion of the slide plate 14 is such that the vertical slot in this plate may be moved from one side of the opening in chamber 21 to the other side. Through the use of the two motors 8 and 9 and their respective ball screw drives the electron gun may be positioned so that the electron beam can be made to strike any point desired on the surface enclosed by the seal plate 20. By means of a suitably programmed numerical control the electron gun may be positioned step wise from one tube to another in any desired sequence for the 3 to 400 tube ends 10 which are enclosed by the seal plate 20. A second vacuum chamber structure is sealed to the opposite header which, depending upon the length of the heat exchanger, may be 20 to 60 feet distant. This second chamber is placed over and sealed around the opposite end of the group of tubes which have been sealed by the electron beam welding machine seal plate. This structure is indicated at 17.

The electron beam welding machine is utilized to position the electron gun as close as possible over the center of each tube ending which it is desired to weld. The accuracy of this positioning is never good enough to insure that the electron beam will strike the circular seam between the tube and the header at all points along the path. It is necessary, therefore, to provide a means for locating the exact geometric center of each tube prior to the time when it is welded to insure that the electron beam in its rotary motion will strike the seam between the tube and header. To this effect a method for electronically determining the center of the hole in the tube has been devised and is the subject of this application.

Figure 4:
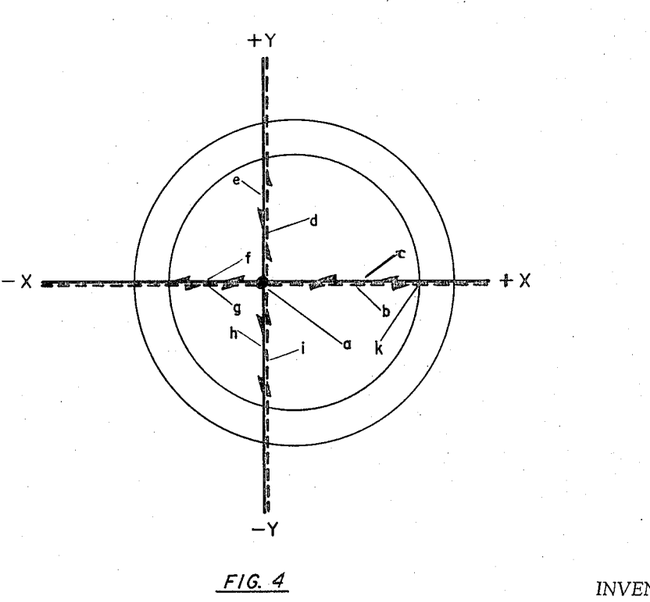
FIG. 4 illustrates a typical scanning pattern which may be utilized in practicing the invention.
Figure 5:
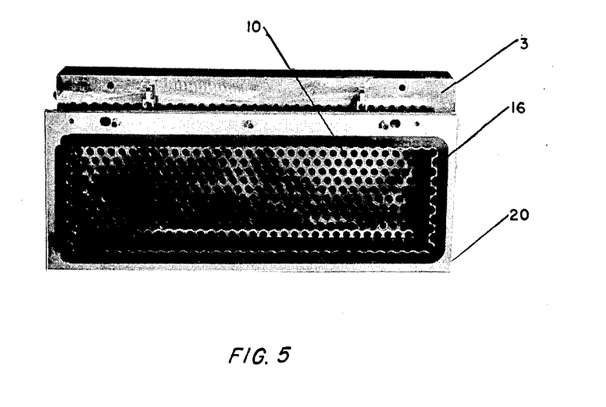
FIG. 5 is a photograph of the welded end of the tube and header assembly as seen through a seal plate.
Figure 6:
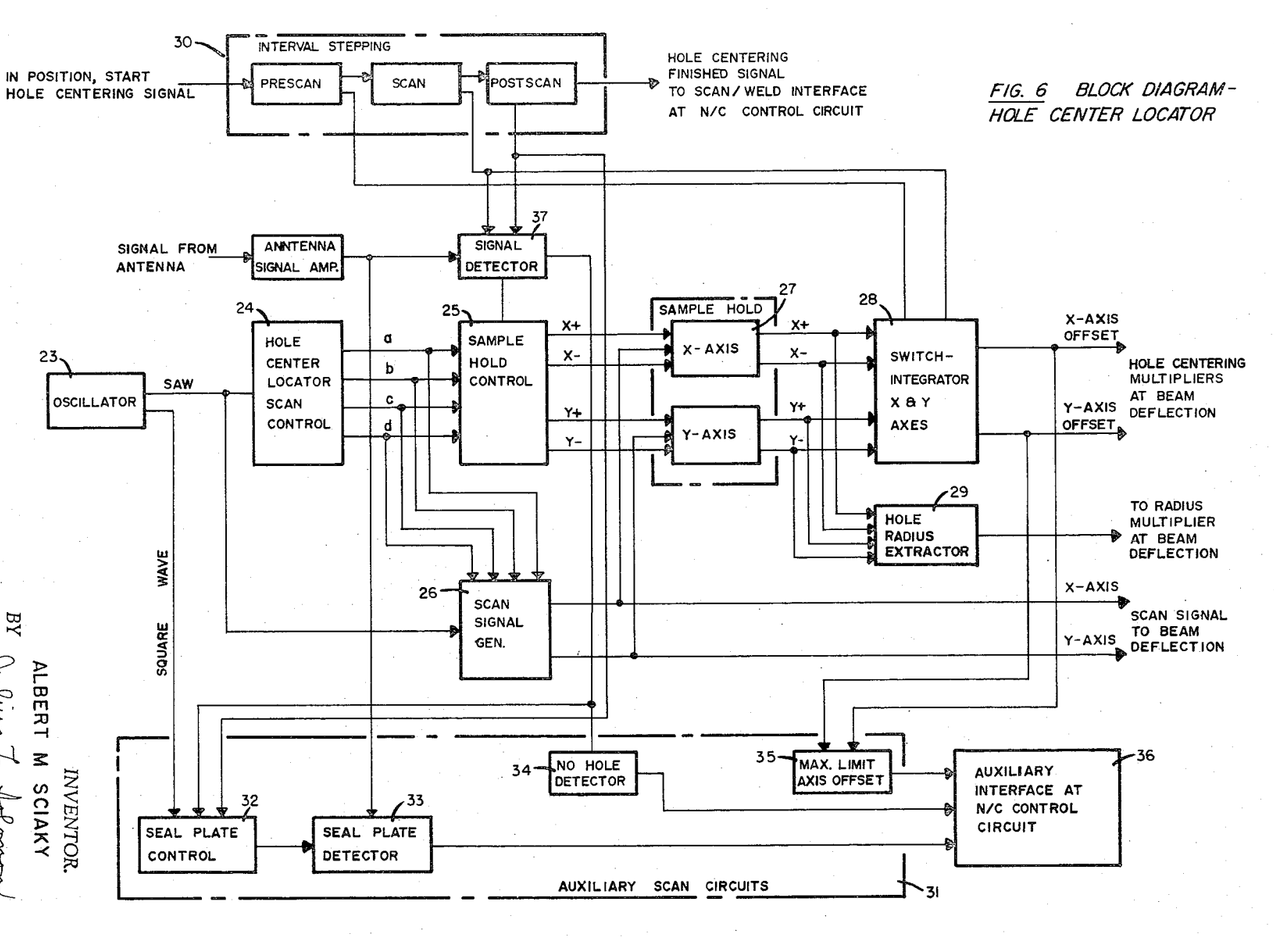
FIG. 6 is a block diagram of the electronic system for locating the center of the hole in the tubing.

FIG. 6 is a block diagram illustrating the method by which the hole at the end of the tube is located and indicates also the relationship of several safety devices and detectors and their relationship to the basic locator control. In order to locate the center of each tube the electron beam generated by the electron beam gun is caused to scan the end of the tube and a portion of the header into which it is inserted, in a specific manner. The scanning pattern is illustrated in FIG. 4. The electron gun is provided with deflection means which can deflect a beam along two mutually perpendicular axes. The at rest or undeflected position of the beam as it would strike a plane which is normal to the axis of the tube and situated at the end of the tube is indicated at point A on FIG. 4. By means of suitable currents fed to the X and Y axis deflection coils the beam is made to scan the area around the end of the tube by moving it outwardly from point A a fixed distance outwardly towards the right along the X-axis and returning to A as indicated by B and C then swept along the Y-axis outwardly and returning to A as shown by D and E followed by the sweep along F, G, H and I. As the electron beam moves outwardly from point A it strikes the inner edge of the tube at point K at which moment reflected electrons generated by the beam striking the edge of the tube, will be picked up by an antenna as is explained in U.S. Pat. application No. 784,574 and a short duration pulse signal will be generated. A second pulse will be generated when the beam moving outwardly along the Y-axis (D) strikes the inner edge of the tube, a third pulse will be generated when the beam strikes the edge of the tube as it moves outwardly towards the left (path F) and a fourth pulse will be generated when the beam strikes the edge of the tube as it moves outwardly in the negative Y direction (path H). The analog of the distance from A to each of the four points at which the beam first strikes the inside edge of the tube during the sweeping operation is sampled and held for each of the four points as positive and negative signals. The positive and negative signals for each axis are summed and integrated and the resulting signal applied to its respective X or Y deflection circuit to bias the deflection circuit and bring the rest position of the beam to the center of the circle. As the rest position of the beam is brought progressively toward the center of the circle the sweeping motion of the beam is continued. When the difference between the positive and negative signals along each of the axes is zero the beam is at the geometric center of the hole. The deflection coil biasing signals are maintained at this level in a memory circuit and the electron beam then caused to rotate so that it traverses the seam between the tube and the header at a sufficient power level to produce a weld along the circular path.

The above is a summary of the general action of the method of the invention. A more specific and complete description will now follow.

SCAN CONTROL SYSTEM

The scan and quadrant signals required to cause the beam to follow the path described above originates from an oscillator that provides saw and square wave output signals. The saw signal (7A) is applied to a scan control 24 on FIG. 6 and a scan signal generator 26. Through the action of logic circuits such as NORS and flip-flop circuits in the scan control the saw output of the oscillator is processed so as to furnish four separate square wave gating signals, one for each of the respective periods that the beam is to be swept sequentially in the +X, +Y, −X and −Y directions.

Figure 7:
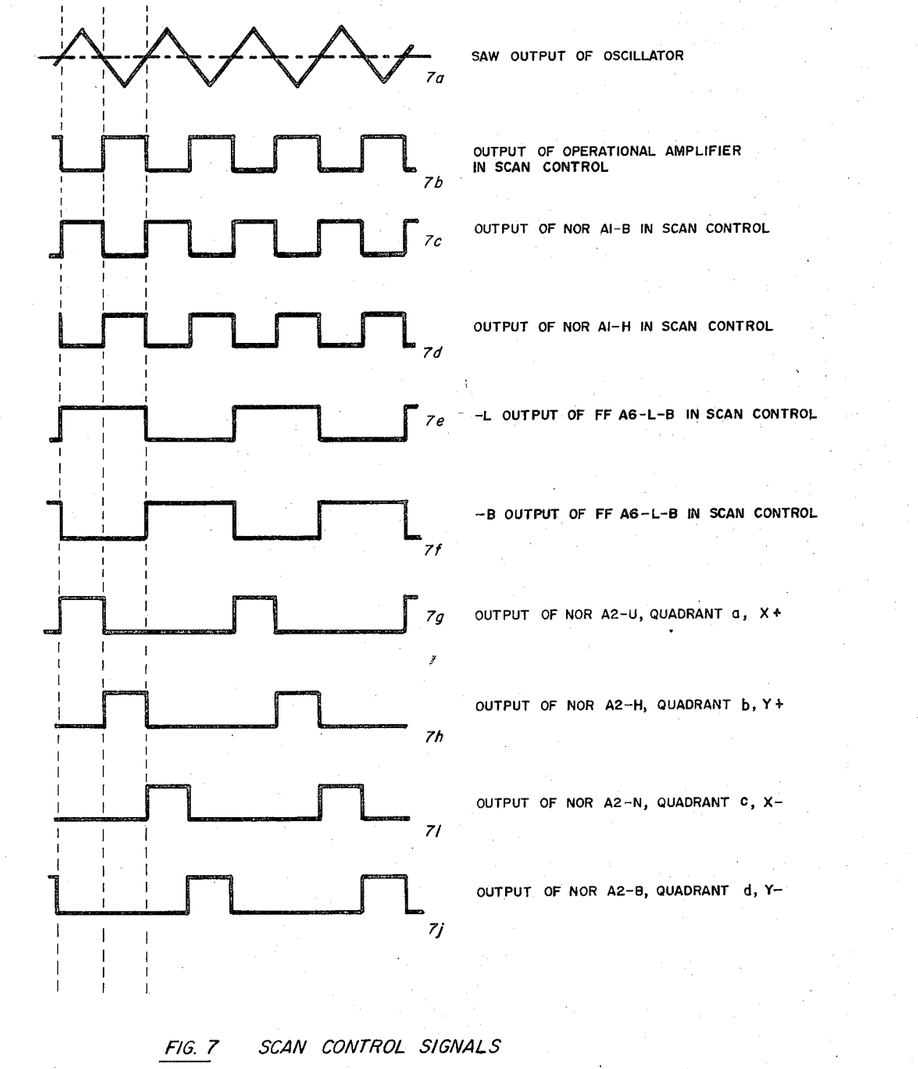

FIG. 7 is a graphical representation of the signals that appear in the various sections of the scan control. 7A illustrates the saw tooth output of the oscillator which is fed to an operational amplifier. This amplifier is connected as an inverter with a zener feedback providing a negative clamp. The input signal drives the amplifier into saturation thus providing a square wave output. The zener clamps the output at about +10 volts. The output will swing from this level to zero volts. Since this signal is inverted, FIG. 7B, the square wave output will be of opposite polarity to the input saw 7A. The square wave output of the operational amplifier is applied to a NOR (A1-B) which inverts the signal so as to obtain a square wave as shown in FIG. 7C. The output of a second NOR (A1-H) shown in 7D is inverted from the output of NOR (A1-B). The signal shown in FIG. 7D is fed to a flip-flop which changes its state each time its input changes from one to zero so that the signal at its output is as shown in 7E. 7F illustrates the output signal from a second flip-flop output terminal of the same.

The gating pulses for each of the four quadrants are produced in the following manner.

Signal 7D and 7F are fed to NOR (A2-U) so as to produce an output as shown in 7G. Signals 7C and 7F are fed to the input of another NOR (A2-H) so as to produce an output signal as shown in 7H. Signal 7D and 7E are fed to NOR (A2-N) resulting in an output signal as shown in 7I and signals 7C and 7E are fed to NOR (A2-B) with the result that signal 7J appears at its output. The four outputs constitute four separate gating signals which follow each other sequentially and are used in conjunction with the saw output of the oscillator to produce the scanning signal which causes the beam to scan the area at the end of each tube in the pattern as indicated above and illustrated in FIG. 4.

SCAN SIGNAL GENERATOR

The scan signal generator 26 on FIG. 6 consists of inverter amplifiers and switching modules which which function as is described below so as to generate the signals that will control the deflection of the beam along the X and Y-axis so that the beam follows the desired scanning pattern.

Figure 8:
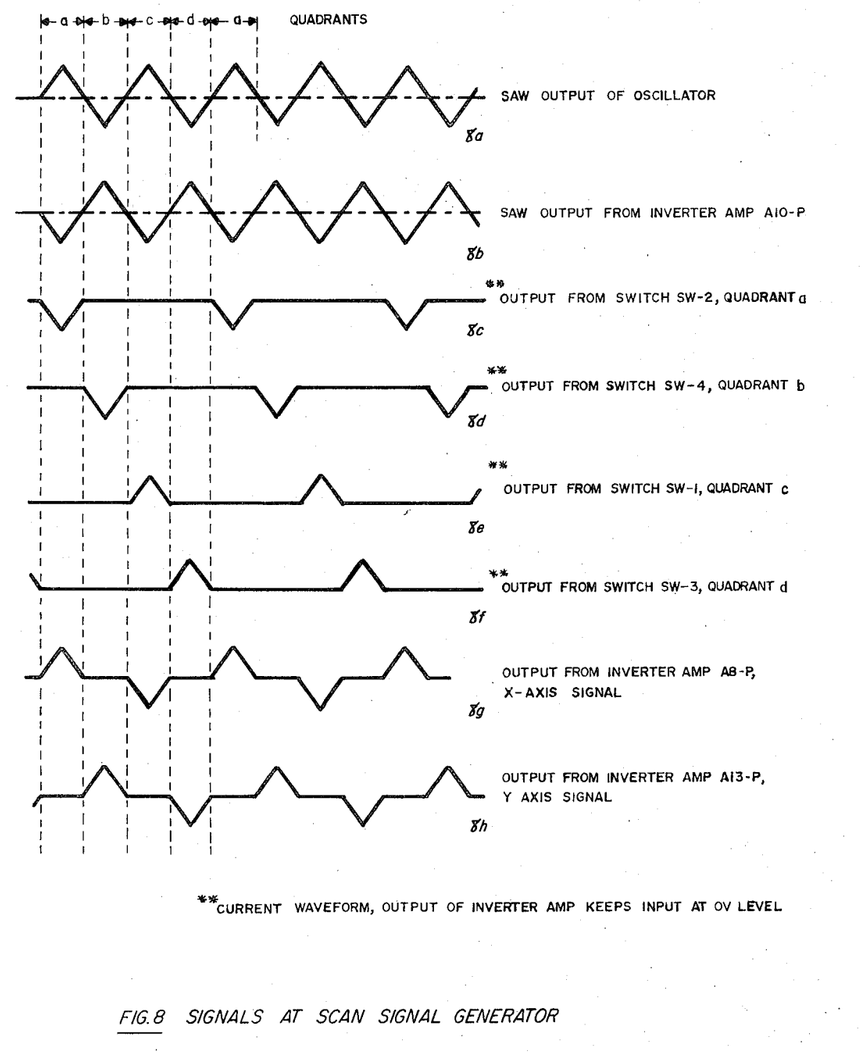

FIG. 8 illustrates the time relationship of the signals which appear at various points in the scan signal generator.

8A illustrates the saw output of the oscillator which is fed to an inverter amplifier at whose output the inverted saw tooth shown in 8B appears. Four switches are utilized to separate four successive half cycles of the saw output of the oscillator. Each of the switches operates in conjunction with its respective square wave gating signal generated in the scan control circuit for each direction or scan. A zero signal holds the switches open, a one signal closes the switch and allows the continuous saw tooth wave to be passed. The signal of quadrant A has been designated as being along the X plus direction, quadrant B as the Y plus direction, quadrant C as the X minus direction and quadrant D as the Y minus direction. Saw tooth 8B is passed through switch 2 under the control of the square wave output of NOR A2-U shown in 7G with the result that the output of switch 2 appears as shown in 8C. Saw tooth 8A is applied to switch 1 which is controlled by the scan control signal 7I with the result that the minus X or quadrant C scan signal shown in 8E is passed. Signals 8C and 8E are then fed to another inverter amplifier which combines and inverts both signals to produce the output shown in 8G which is the signal which controls the X axis deflection coil. Signals 8D and 8F are then produced by passing saw tooth 8A and 8B respectively through switches 4 and 3 respectively under the control of square wave gating signals shown in 7H and 7F respectively. Signals 8D and 8F are applied to an inverter amplifier whose output has the form shown in graph 8H which is the scan signal for the Y-axis deflection coil. Signals 8G and 8H applied respectively to the X and Y-axis deflection coils will produce the scan pattern illustrated in FIG. 4.

When the electron beam during its scanning motion strikes the work piece some of the electrons are reflected and are collected by an antenna and fed to a pulse forming circuit which generates a narrow pulse which provides a signal effectively indicating the distance from the start point of the beam for that particular sweep to the leading edge of the work piece in each quadrant.

SAMPLE/HOLD AND SWITCH INTEGRATOR

The sample hold circuit provides four output signals that effectively indicate the radii of the scan from the rest position of the beam to the leading edge of the work in each quadrant. Each radius is represented by a DC level corresponding to the amplitude of the saw signal of the operating quadrant at the time the beam strikes the leading edge of the work. The sample hold circuit consists of several NOR gates and a sample hold module for each quadrant. The sample hold modules provide an output for each quadrant. Each module has two operating modes, sample and hold, and two inputs, control and signal. A one signal from a NOR at the control input transfers the module to the sample mode. In this mode, the output follows the input. When the control input is returned to zero, the output is clamped at a DC level corresponding to the amplitude of the signal at the signal input terminal. Each sample of the sample hold module is activated in turn during its respective scanning period or quadrant. For a particular quadrant the output of the sample hold is the voltage of the last held sample. As the scanning beam strikes the hole edge a control pulse is formed and the leading edge of the control pulse which rises rapidly to a one is applied to the control terminal of the sample hold module so that it transfers to the sample mode. The output will follow the sampled signal and when the square wave returns from one to zero the sample hold module is immediately placed in the hold condition so that the amplitude of the sweep at the moment the scanning beam struck the edge of the seam is retained in the sample hold memory. This action is repeated in each of the four sample hold modules as each quadrant is scanned. The saw outputs of the scan signal generator provide the signal inputs during the time that the signals are active in each of the particular quadrants. Each X and Y saw output from the scan signal generator has a zero to plus 10 volts and a zero to minus 10 volt component. For each axis output one module only is turned on when the saw is plus and the other when the saw is minus. Each module will thus provide an output that ranges from zero to 10 volts with a polarity that is the same as the input saw during the time the module is on. The exact level of the output signal will depend on the diameter of the hole and the distance from the at rest position of the beam with respect to the edge of the seam for the quadrant being scanned. The polarity of the saw during quadrants A and B is positive and during quadrants C and D is negative. In the four sample hold modules two have outputs along the X-axis, one positive the second negative, and two have Y-axis outputs, one positive and one negative. The positive and negative outputs of the X modules and the positive and negative outputs of the Y modules are summed at associated amplifiers in a switched integrator circuit. The switched integrator circuits have two control terminals — let us call them P and Q — which act upon the four outputs of the sample hold modules in order to produce the separate X axis and Y-axis offset signals which will be directed to the deflection circuits of the electron beam gun system so as to bias the currents through the separate deflection coils so as to bring the beam automatically to the center of the tube to be welded. The X plus and minus output of the sample hold X-axis system is fed to the switch-integrator and when the P and Q terminals are both positive with respect to the ground the algebraic sum of the two X voltages will be integrated. Likewise the algebraic sum of the plus and minus Y-axis hold voltages will be integrated in a separate integrator. When a positive is applied to the P terminal and a negative voltage is applied to the Q terminal the output of the integration will be held in memory for each of the axes. When a negative voltage is supplied to P and either positive or negative on Q the integrator will be reset to zero.

Figure 9:
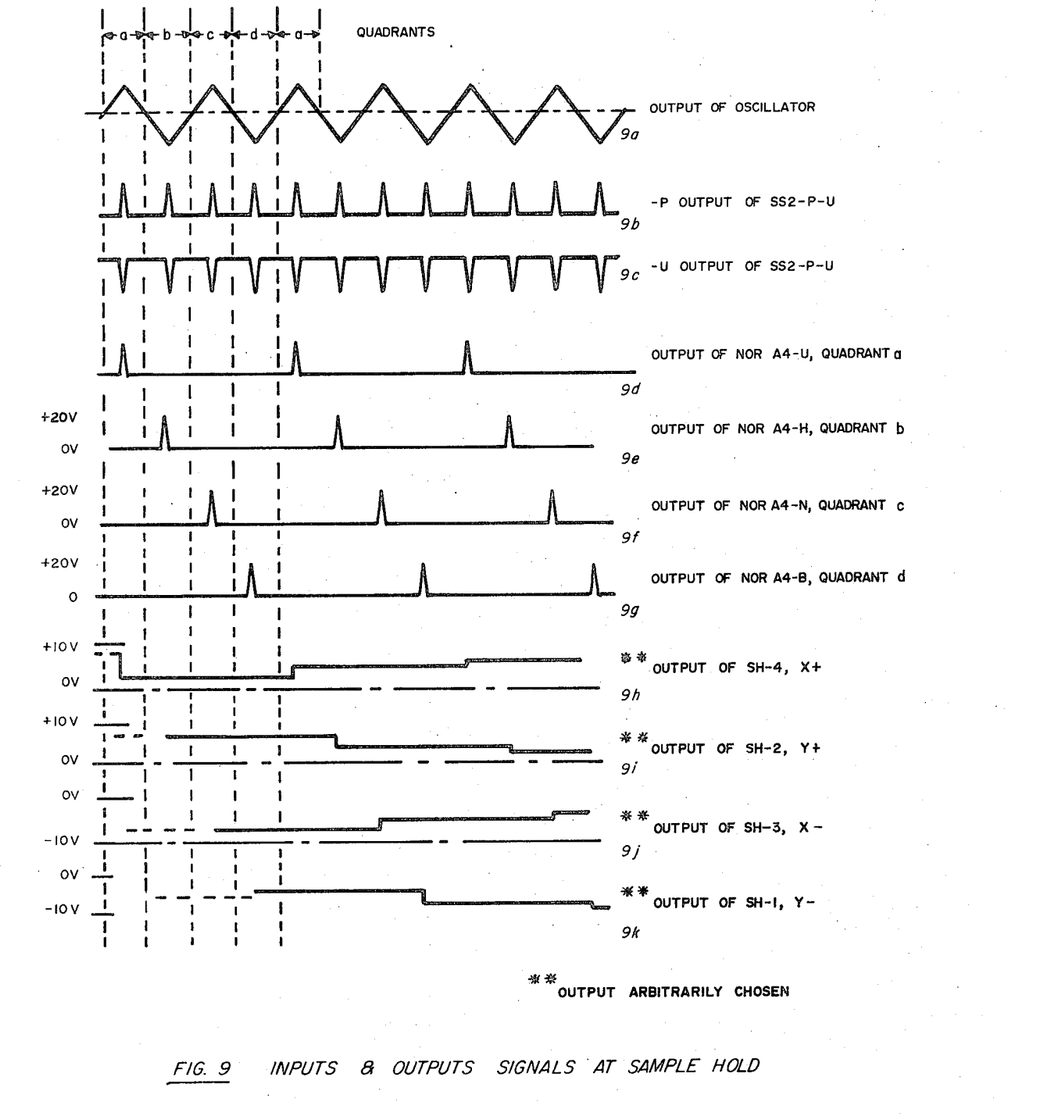
FIG. 9 illustrates the input and output signals at the sample and hold controls.

FIG. 9 illustrates the input and output signals at the sample hold. 9A represents the output of the oscillator which is running at about 160 Hz. 9B represents the pulses which are formed as the beam strikes the edge of the tube in each quadrant. 9D, E, F and G illustrate the pulses as they have been separated for each of the quadrants and 9H, 9I, 9J and 9K represent the four voltages present at the output of the sample hold switches during several scanning sequences. During the scanning operation these voltages will change inasmuch as the beam is being moved towards the center of the tube as the scanning progresses.

Note therefore that as the voltage held at the output of SH4, which represents the X plus direction, is beccomming more positive, the voltage held at the output of SH3, representing the X minus direction, becomes less negative until the sum of the X plus and X minus voltages approaches zero. When this occurs for both the X and Y-axis the beam is being held at rest at the geometric center of the circle.

HOLE RADIUS EXTRACTOR

The four output voltages from the sample hold modules are also delivered to a hole radius extractor which sums the absolute value of these voltages and divides the sum by four so as to obtain the radius of the end of the tube being scanned. This signal is delivered to the beam deflection circuit in order to control the radius of the circle which is to be swept by the beam during the welding operation.

The above describes the method in accordance with the invention of locating the center of a hole through the use of an electron beam and associated circuitry and apparatus.

The overall hole center locator control includes an interval stepping function which controls intervals termed pre-scan, scan and post-scan and provides signals to initiate operations associated with each interval, as well as several auxiliary functions which serve as safetys to inhibit the welding function under certain conditions. The pre-scan system provides a signal to initiate the scan interval and a reset-unlock signal to the Integrator-Switches of the X and Y-axes. The time delay provided by this circuit allows the filament of the electron beam gun to reach its operating temperature. This circuit consists of several NORS and associated components.

Figure 10:
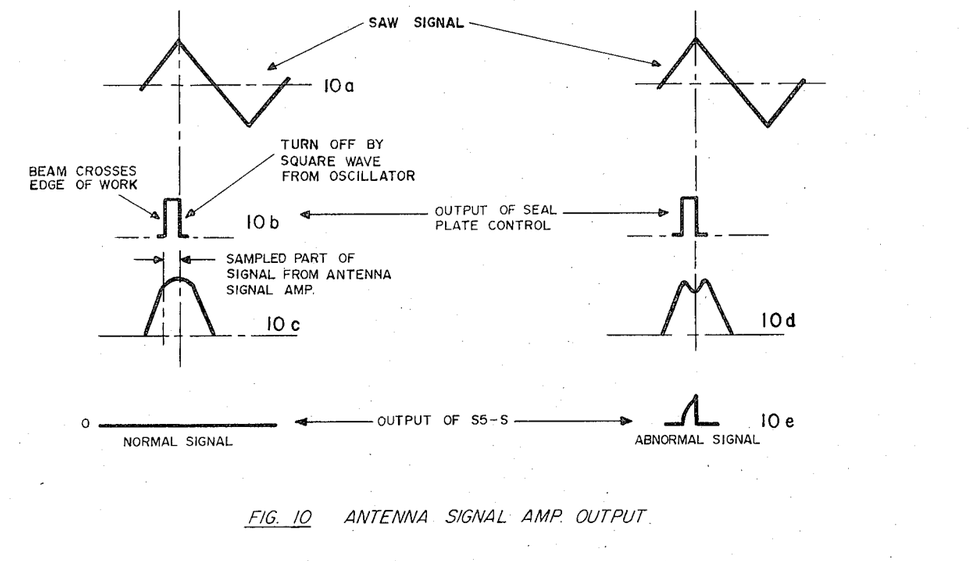
FIG. 10 is a graphical representation of the signals appearing at certain sections of the seal plate detector system.

At the beginning of the pre-scan interval the output of one of the NORS provides a momentary zero to terminal P of the Switch-Integrators. A second output from another NOR switches to a 1 at the end of the pre-scan interval — approximately ½ second — and provides an initiating signal to the scan interval circuit which, in turn, provides an initiating signal to the Q terminal of the switch integrators for the X and Y-axes and an unlock signal to the signal detector circuit. The time delay provided by the scan circuit allows the associated circuits to locate the at rest position of the beam at the center of the hole. At the end of the scan interval one of its output signals initiates the post scan interval and locks the switched integrator circuit. The post-scan circuit provides an unlock signal to the seal plate detector circuit and a hole-centering-finished signal to the sequence circuits of the welder. The delay provided by this circuit provides time for the seal plate detector, one of the auxiliary functions provided for in the control, to perform its function. Other auxiliary functions are the no-hole detector and the X and Y offset-limit. The hole/no-hole detector is provided to insure that a hole is sufficiently in position so that an edge-of-work pulse is obtained in each quadrant. If these conditions are not obtained an inhibit signal is provided to the weld sequence logic which controls the actual welding of the tube to the header. The X and Y offset-limit circuit monitors the location of the hole with respect to a signal representing the normal position of the beam with no bias on the deflection coils. If this location is within prescribed limits of the center on both axes a qualifying signal is provided to the weld sequence logic. If this location is beyond the preset distance at either axis an inhibit signal is provided. The seal plate control provides a signal to unlock the seal plate detector for a momentary sampling interval each time the beam crosses the leading edge of the work in the post-scan interval. Should the seal plate be too close to the edge of a hole, a signal, as shown in FIG. 10E, will be generated which indicates that the hole is out of position with respect to the seal plate. In this case this signal will cause an inhibit signal to be delivered to the weld sequence logic circuits. When the hole is correctly positioned with respect to the seal plate, the beam does not strike the seal plate and a qualifying signal is sent to the weld sequence logic circuit which will allow the welding to proceed if the proper qualifying signals are obtained from the X and Y offset limit control and the hole/no-hole detector.

FIG. 10 illustrates the signals which will be present in the seal plate detector system for the case where the hole is correctly positioned with respect to the seal plate and a second case where the hole is too close to the seal plate.

FIG. 10A illustrates the saw signal which causes the beam to deflect.

FIG. 10B is a square wave generated from the time the beam crosses the edge of the work to the time when the beam reaches its farthest position from the center. If the seal plate has not been struck, the electron flow to the antenna will take the form shown in C. Should the seal plate be too close to the edge of the hole, the reflected electron current flow will take the form shown in FIG. D. The current will reach a maximum value during the period of the square wave generated at the output of the seal plate control and will then dip to a lower value before the beam reaches the end of its sweep. The reflected electron current is differentiated and if a dip occurs in the signal, as shown in D, a positive output voltage is obtained which will cause the welding circuit to be inhibited.

Figure 11:
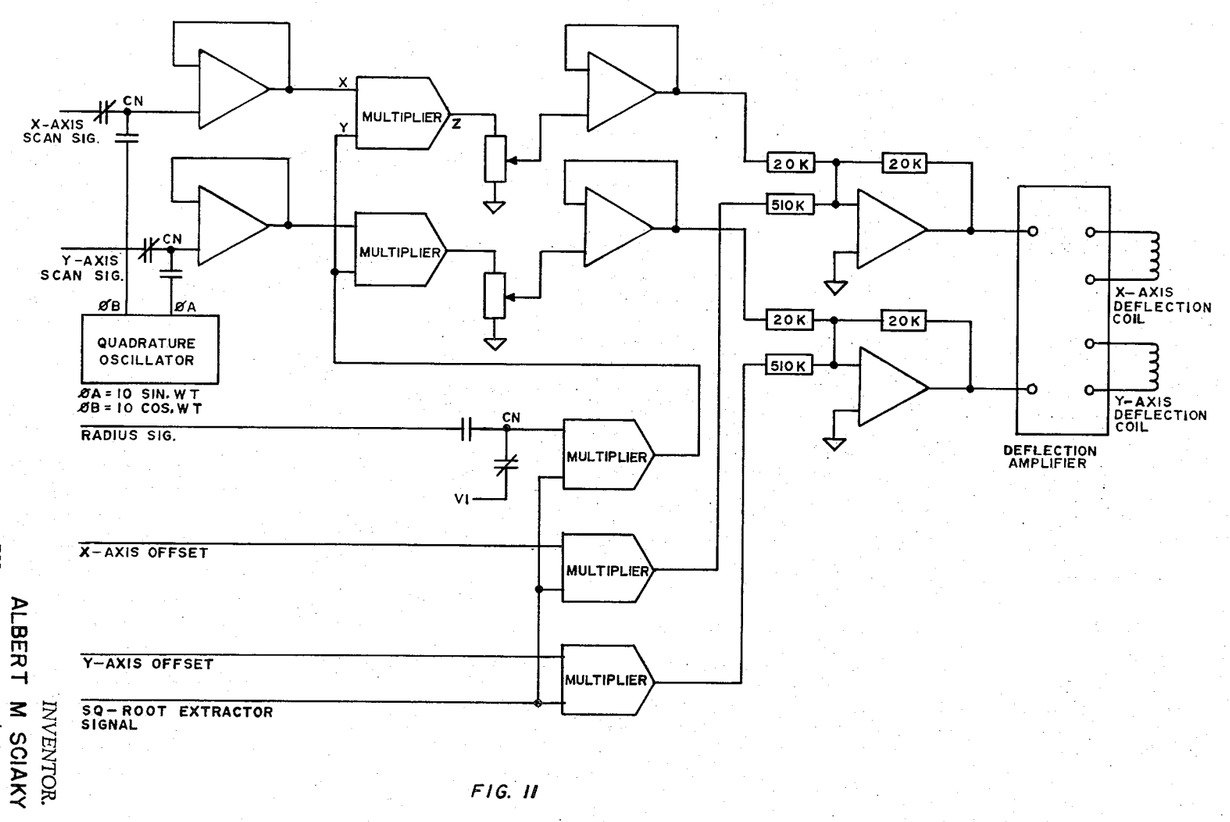
FIG. 11 is a schematic drawing of the circuit for processing information received from the scanning system and translating it to deflection coil currents.

FIG. 11 is a schematic drawing which indicates the manner in which the X and Y-axis scanning signals which cause the beam to follow the circular path desired, the radius signal, the X and Y-axis offset signals, and a signal which is proportional to the square root of the accelerating voltage of the electron gun, are combined and processed in order to produce the X-axis and Y-axis deflection coil currents. The X-axis offset signal is multiplied by an analog voltage which is proportional to the square root of the acceleration voltage of the electron gun in an electronic multiplier whose output is fed to one of the two input terminals of an amplifier whose output feeds the deflection amplifier which feeds the X-axis deflection coil.

The second input terminal of this amplifier receives the X axis scanning signal so that the output of this amplifier represents the combined signals for driving the X-axis deflection amplifier and deflection coil.

The Y axis offset signal and scanning signal are processed in a like manner and the currents through the X and Y-axis deflection coils cause the beam to follow a circular path of the desired radius with suitable correction to the currents for variations in acceleration voltage.

The system may be adapted to find the center of symetrical shapes other than circles, for example the geometric center of squares, ellipses, hexagons and other shapes may be easily found by the method disclosed.

The method may also be applied to find the center of tubes into which plugs have been inserted so as to seal material inside the tubes. An example of this would be the end closures of tubes used as fuel elements for nuclear reactors. The plugs must be welded to the tubes at the seam formed between tube and plug at the ends of the tubes.

In welding the plug into the tube the electron beam is directed towards the seam in the axial direction and is caused to follow the seam as has been described above so as to produce a continuous endless weld along the joint between tube and plug.

The ends of the plug and tube assembly may be scanned in the same manner as the hole area is scanned in and around the tubes in the tube and header assembly described above.

Having described the method of the invention, together with an illustrative embodiment of apparatus for carrying out the method in the welding of tubes to headers for heat exchangers, it is understood that the invention is not limited to this application since it may be applied to other shapes and forms without departing from the scope of the invention.

What is claimed is:

1. A method of finding the geometric center of a hole in a part to be welded to a second part along a line concentric to the edge of the hole, comprising the steps of generating and focusing a corpuscular beam; directing the said beam essentially normal to a plane defined by the intersection of the said edge of the hole with the outer surface of the said part at its rest position it is within an area on the plane circumscribed by the said edge of the hole; deflecting the said beam out from and back to the at rest position of the beam sequentially along four separate radial paths along mutually perpendicular axes lying on said plane; generating an electrical pulse whenever the said beam strikes the said edge of the hole during each of said outward deflections; generating separate voltages, by the action of each of said pulses, which represent the distance and direction from the rest position of the beam to the edge of the hole along each of the said paths; adding algebraically, by electrical means, the voltages representing the said distances on one of said axes and simultaneously adding electrically the voltages representing the said distances on the other axis so as to obtain separate voltages which represent the deviation of the at rest position of the beam from the center of the hole along each of the said axes; and causing the beam to be deflected along the said axes through the action of the last mentioned voltages so that the beam passes through the geometric center of the said hole.

2. A method as in claim 1 in which one of the parts is the header of a heat exchanger which has been drilled with holes through its thickness and into which the ends of tubes to be welded to said header are inserted.

3. A method as in claim 1 including the additional steps of adding arithmetically, by electrical means, the voltages representing the distances from the said rest position to the edge of the said hole for each of the said radial paths; dividing, by electrical means, the sum of said voltages by the number of said paths so as to obtain a voltage representing the average value of the radius of said hole; adding to said last mentioned voltage, by electrical means, a voltage which represents the distance from the periphery of the hole to the aforementioned line along which the aforesaid parts are to be welded; applying the resulting sum voltage to a means for controlling the movement of the electron beam and controlling by said last mentioned means the motion of the beam so that it follows the said line at a preset tangential velocity.

4. A method as in claim 3 including the additional step of increasing the intensity of the said beam so that a weld is effected between the aforementioned parts along the said line.

5. A method in accordance with claim 3 in which the said beam is a beam of electrons.

* * * * *

UNITED STATES PATENT OFFICE
CERTIFICATE OF CORRECTION

Patent No. 3,814,896　　　　　　　　Dated June 4, 1974

Inventor(s) Albert M. Sciaky

It is certified that error appears in the above-identified patent and that said Letters Patent are hereby corrected as shown below:

Column 9, line 48, after "part" insert -- so that --.

Signed and sealed this 1st day of October 1974.

(SEAL)
Attest:

McCOY M. GIBSON JR.　　　　　　　　C. MARSHALL DANN
Attesting Officer　　　　　　　　　　Commissioner of Patents